US011953845B2

(12) United States Patent
Kang et al.

(10) Patent No.: US 11,953,845 B2
(45) Date of Patent: Apr. 9, 2024

(54) STRUCTURE FOR DRIVING TONER INLET SHUTTER OF DEVELOPING CARTRIDGE BY USING MOTOR

(71) Applicant: Hewlett-Packard Development Company, L.P., Spring, TX (US)

(72) Inventors: Shin-Hyup Kang, Seongnam-si (KR); Jiwon Moon, Seongnam-si (KR); Jinhwa Hong, Seongnam-si (KR); Minchul Lee, Seongnam-si (KR); Suseong Lee, Seongnam-si (KR); JungMin Yang, Seongnam-si (KR); Kok Weng Chan, Singapore (SG); Lian Chye Simon Tan, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/014,741

(22) PCT Filed: Dec. 14, 2020

(86) PCT No.: PCT/US2020/064781
§ 371 (c)(1),
(2) Date: Jan. 5, 2023

(87) PCT Pub. No.: WO2022/010528
PCT Pub. Date: Jan. 13, 2022

(65) Prior Publication Data

US 2023/0152730 A1 May 18, 2023

(30) Foreign Application Priority Data

Jul. 6, 2020 (KR) ........................ 10-2020-0082993

(51) Int. Cl.
*G03G 15/08* (2006.01)
*G03G 21/16* (2006.01)

(52) U.S. Cl.
CPC ....... *G03G 15/0886* (2013.01); *G03G 15/087* (2013.01); *G03G 15/0898* (2013.01);
(Continued)

(58) Field of Classification Search
CPC ............. G03G 15/0886; G03G 15/087; G03G 21/1647; G03G 2215/0668;
(Continued)

(56) References Cited

U.S. PATENT DOCUMENTS 5,307,129 A * 4/1994 Miura ................ G03G 15/0893
222/DIG. 1
5,345,297 A * 9/1994 Katakabe ........... G03G 15/0886
222/DIG. 1

(Continued)

FOREIGN PATENT DOCUMENTS

EP 2719538 A1 4/2014
EP 2799936 A1 11/2014

(Continued)

*Primary Examiner* — Arlene Heredia
*Assistant Examiner* — Laura Roth
(74) *Attorney, Agent, or Firm* — Foley & Lardner LLP

(57) ABSTRACT

An example image forming apparatus includes a main body, a driving motor, a developing cartridge, and a clutch. The developing cartridge includes a toner container, a mounting portion to receive a toner refill cartridge, a toner inlet portion to connect the mounting portion to the toner container, and a toner inlet shutter to be switched between a blocking location for blocking the toner inlet portion and an inlet (Continued)

location for opening the toner inlet portion. The clutch is to selectively transmit a driving force of the driving motor to the toner inlet shutter.

15 Claims, 9 Drawing Sheets

(52) U.S. Cl.
CPC ..... *G03G 21/1647* (2013.01); *G03G 15/0877* (2013.01); *G03G 2215/0668* (2013.01); *G03G 2215/0673* (2013.01); *G03G 2215/0678* (2013.01); *G03G 2215/0692* (2013.01); *G03G 2221/1657* (2013.01)

(58) Field of Classification Search
CPC ....... G03G 2221/1657; G03G 15/0877; G03G 15/0874; G03G 15/0894; G03G 2215/0692; G03G 2215/0673; G03G 2215/0678; G03G 2215/0675; G03G 2221/1648; G03G 15/0898
See application file for complete search history.

(56) References Cited

U.S. PATENT DOCUMENTS

| | | | | |
|---|---|---|---|---|
| 6,185,401 | B1 * | 2/2001 | Kanamori .......... | G03G 15/0855 399/119 |
| 6,418,292 | B1 * | 7/2002 | Isobe ................. | G03G 15/0875 399/258 |
| 7,447,470 | B2 | 11/2008 | Lee | |
| 2004/0161266 | A1 * | 8/2004 | Ban .................... | G03G 15/0865 399/258 |
| 2009/0060585 | A1 * | 3/2009 | Ishiguro ............. | G03G 15/0886 399/237 |
| 2010/0085404 | A1 | 4/2010 | Akiyama | |
| 2014/0161486 | A1 | 6/2014 | Sato | |
| 2021/0349412 | A1 * | 11/2021 | Kim ................... | G03G 15/0877 |

FOREIGN PATENT DOCUMENTS

| | | | |
|---|---|---|---|
| JP | 3167014 | U | 3/2011 |
| JP | 2014-178417 | A | 9/2014 |
| KR | 10-2006-0077958 | A | 7/2006 |
| KR | 10-2009-0091089 | A | 8/2009 |
| WO | WO-2023018440 | A1 * | 2/2023 |

* cited by examiner

STRUCTURE FOR DRIVING TONER INLET SHUTTER OF DEVELOPING CARTRIDGE BY USING MOTOR

CROSS-REFERENCE TO RELATED APPLICATIONS

This application is filed under 35 U.S.C. § 371 as a National Stage of PCT International Application No. PCT/US2020/064781, filed Dec. 14, 2020, which claims priority to KR Patent Application No. 10-2020-0082993, filed Jul. 6, 2020, which are incorporated by reference herein in their entireties.

BACKGROUND

An image forming apparatus using an electrophotographic method forms a visible toner image on a photoconductor by supplying toner to an electrostatic latent image formed on the photoconductor, transfers the toner image to a print medium via an intermediate transfer medium or directly, and fixes the transferred toner image on the print medium.

A developing cartridge contains toner to form the visible toner image by supplying toner to the electrostatic latent image formed on the photoconductor. When toner contained in the developing cartridge is consumed, the developing cartridge may be removed from the image forming apparatus, and a new developing cartridge may be mounted in the image forming apparatus. As an alternative, a toner refill kit, such as a toner refill cartridge, may be mounted on a toner refilling portion to refill the developing cartridge with new toner.

DETAILED DESCRIPTION

An electrophotographic image forming apparatus includes a developing cartridge in which toner is contained. The developing cartridge is to supply toner to an electrostatic latent image formed on a photoconductor to develop the electrostatic latent image into a visible toner image. When toner contained in the developing cartridge is consumed, a toner refill cartridge may be used to refill the developing cartridge with new toner. A toner inlet shutter provided in the developing cartridge may be rotated to open a toner inlet by mounting the toner refill cartridge on the developing cartridge and rotating the toner refill cartridge. However, when a user excessively rotates the toner refill cartridge, the toner inlet shutter may break. When the user does not fully rotate the toner refill cartridge, the toner inlet may not be completely opened, and thus, toner may leak in a toner refilling process.

In an example, a driving motor may be used to drive a toner inlet shutter for opening and closing a toner inlet. A driving force of the driving motor may be selectively transmitted to the toner inlet shutter by a clutch. The clutch may selectively transmit the driving force to the toner inlet shutter according to a rotation direction of the driving motor. A location of the toner inlet shutter may be detected by a location detecting sensor, and thus, may be reliably switched between a location for opening the toner inlet and a location for closing the toner inlet. A toner outlet shutter for opening and closing a toner outlet of the toner refill cartridge may be connected to the toner inlet shutter and driven by the driving motor. Hereinafter, examples of an image forming apparatus will be described with reference to the accompanying drawings.

Figure 1:
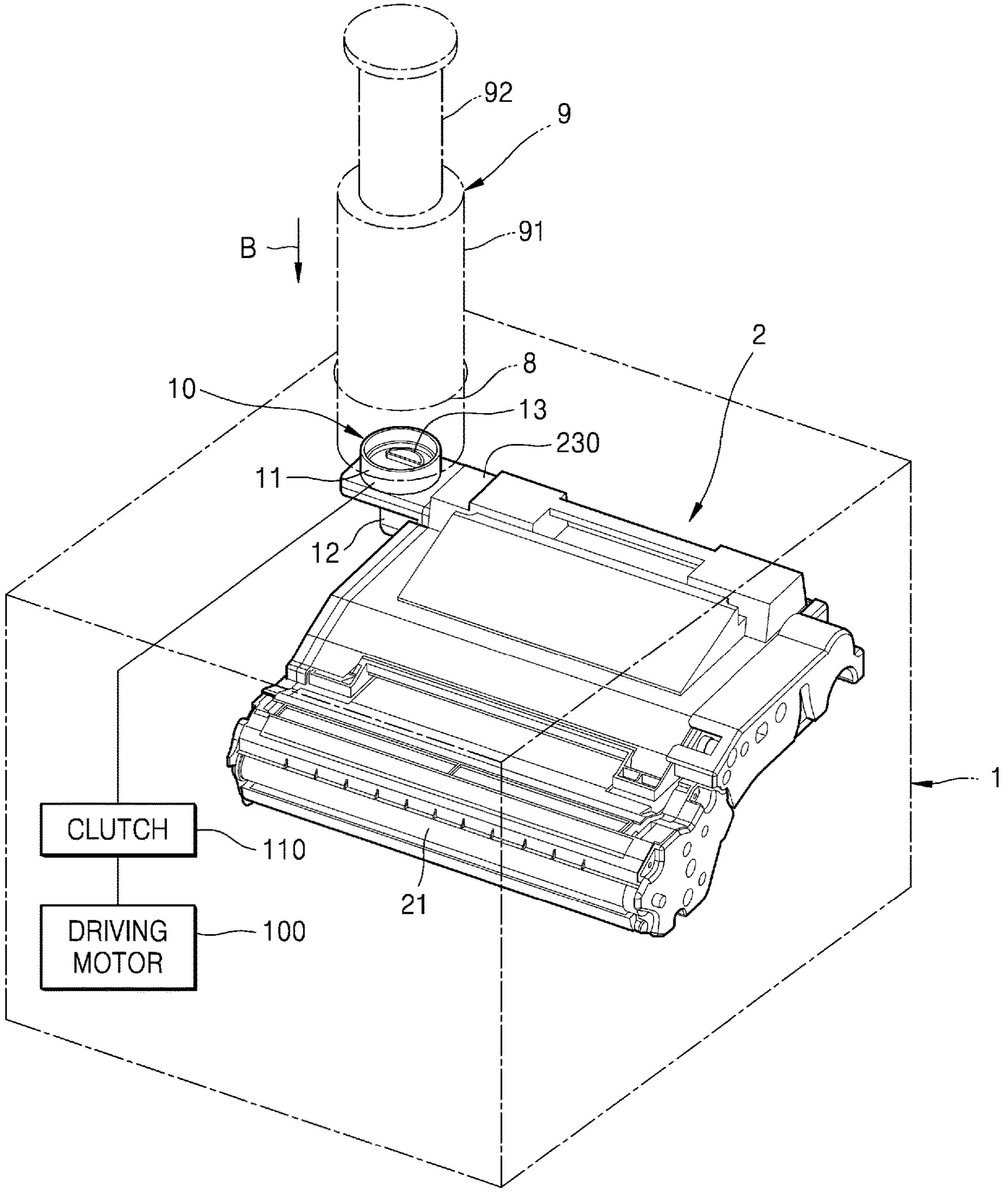
FIG. 1 is a schematic perspective view of an electrophotographic image forming apparatus according to an example.

FIG. 1 is a schematic perspective view of an electrophotographic image forming apparatus according to an example.

Referring to FIG. 1, an electrophotographic image forming apparatus may include a main body 1, a driving motor 100, a developing cartridge 2 for forming a visible toner image by supplying toner contained in a toner container 230 to an electrostatic latent image formed on a photoconductor, and a clutch 110. The developing cartridge 2 may include the toner container 230 in which toner may be contained, a mounting portion 11 to receive a toner refill cartridge 9, a toner inlet portion 12 for connecting the mounting portion 11 to the toner container 230, and a toner inlet shutter 13 which may be switched between a blocking location, for blocking the toner inlet portion 12, and an inlet location, for opening the toner inlet portion 12. The clutch 110 is to selectively transmit a driving force of the driving motor 100 to the toner inlet shutter 13.

Figure 2:
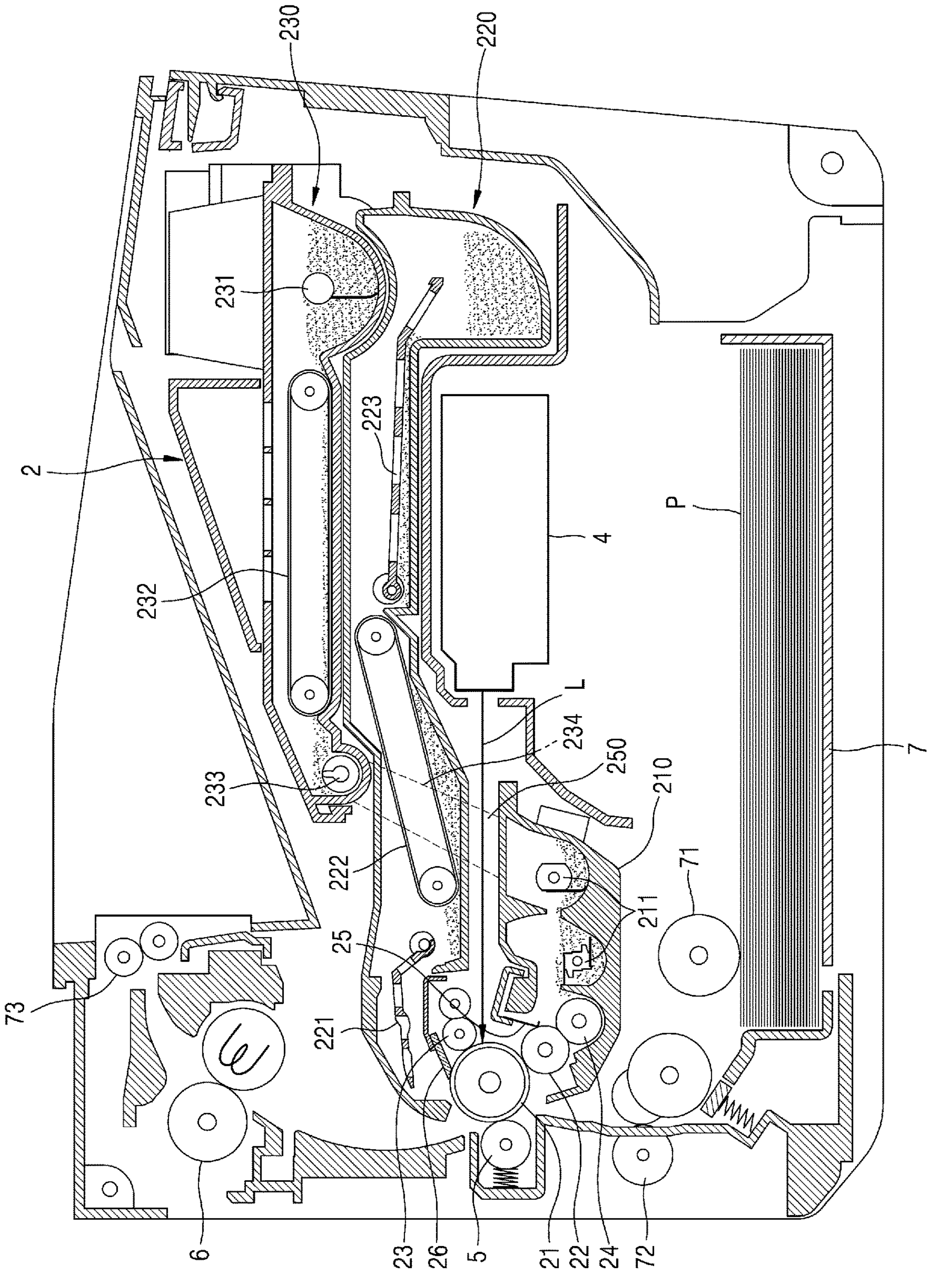
FIG. 2 is a schematic configuration diagram of the electrophotographic image forming apparatus shown in FIG. 1 according to an example.

FIG. 2 is a schematic configuration diagram of the electrophotographic image forming apparatus shown in FIG. 1 according to an example.

Referring to FIG. 2, an image forming process will be briefly described. A charging bias voltage may be applied to a charging roller 23, and the charging roller 23 may charge a photosensitive drum 21 with a uniform electric potential. An optical scanner 4 is to scan the photosensitive drum 21 with light modulated corresponding to image information to form an electrostatic latent image on a surface of the photosensitive drum 21. A supply roller 24 is to supply toner to a surface of a developing roller 22. A regulating member 25 is to form a toner layer of a uniform thickness on the surface of the developing roller 22. A developing bias voltage may be applied to the developing roller 22. As the developing roller 22 rotates, toner conveyed to a development nip is moved and adhered, by the developing bias voltage, to the electrostatic latent image formed on the surface of the photosensitive drum 21, so that a visible toner image is formed on the surface of the photosensitive drum 21. A print medium P withdrawn from a medium supply device 7 by a pickup roller 71 is transported by a transporting roller 72 to a transfer nip where a transfer roller 5 faces the photosensitive drum 21. When a transfer bias voltage is applied to the transfer roller 5, the toner image is transferred to the print medium P by electrostatic attraction. As the toner image transferred to the print medium P is fixed to the print medium P by receiving heat and pressure from a fuser 6, printing is completed. The print medium P is discharged by a discharge roller 73. Toner remaining on the surface of the photosensitive drum 21 rather than being transferred to the print medium P is removed by a cleaning member 26.

As illustrated in the examples of FIGS. 1 and 2, the developing cartridge 2 may include a developing portion 210 in which the photosensitive drum 21 and the developing roller 22 are installed, a waste toner container 220 in which waste toner removed from the photosensitive drum 21 may be contained, and the toner container 230, which is connected to the developing portion 210 and in which toner may be contained. The developing cartridge 2 may include a toner refilling portion 10 connected to the toner container 230 to refill the toner container 230 with toner. The toner refilling portion 10 is to provide an interface between the toner refill cartridge 9 and the developing cartridge 2. The developing cartridge 2 may be an integral developing cartridge including the developing portion 210, the waste toner container 220, the toner container 230, and the toner refilling portion 10.

One or more conveying members 211 may be installed in the developing portion 210 to convey toner toward the developing roller 22. The conveying member 211 may also agitate toner to charge the toner with a preset electric potential. The waste toner container 220 is spaced upwards from the developing portion 210 to form therebetween a passage 250 for exposure light L irradiated from the optical scanner 4 to the photosensitive drum 21. Waste toner removed from the photosensitive drum 21 by the cleaning member 26 may be contained in the waste toner container 220. Waste toner may be transported into the waste toner container 220 by one or more waste toner transporting members 221, 222, and 223. The toner container 230 may contain toner and is connected to the developing portion 210 by a toner supply portion 234 as indicated by a dashed line in FIG. 2. The toner supply portion 234 is located outside an effective width of the exposure light L to avoid interference with the exposure light L scanned in a main scanning direction by the optical scanner 4. One or more toner supply members 231, 232, and 233 may be installed in the toner container 230 to supply toner to the developing portion 210 through the toner supply portion 234. The toner supply member 233 may convey toner in the main scanning direction and transfer the toner to the toner supply portion 234.

Figure 3:
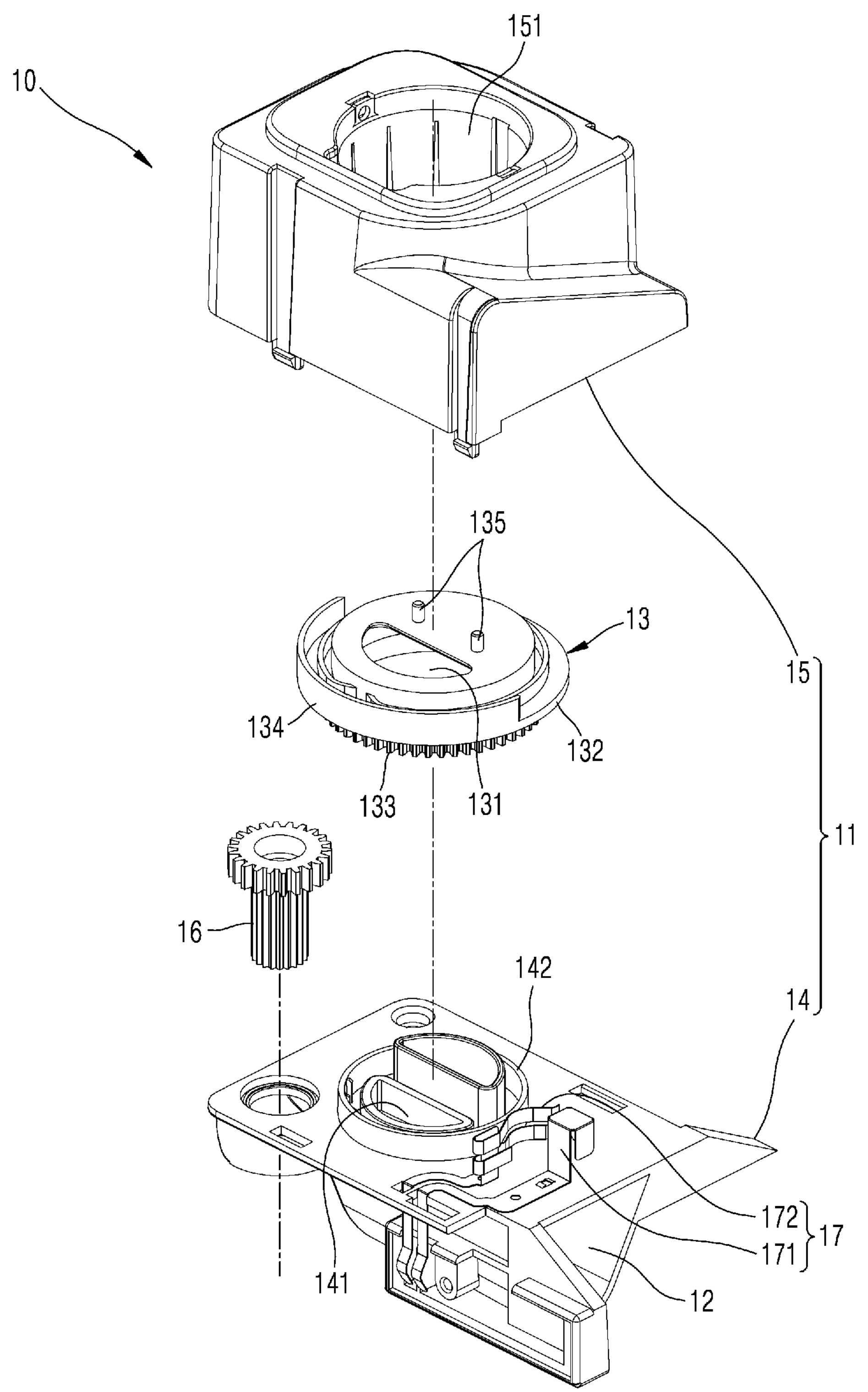
FIG. 3 is an exploded perspective view of a toner refilling portion according to an example.

FIG. 3 is an exploded perspective view of a toner refilling portion according to an example.

Referring to FIG. 3, the toner refilling portion 10 may include a mounting portion 11 on which the toner refill cartridge 9 may be received, a toner inlet portion 12 for connecting the mounting portion 11 to the toner container 230, and a toner inlet shutter 13, which is switchable between a blocking location for blocking the toner inlet portion 12 and an inlet location for opening the toner inlet portion 12.

The mounting portion 11 is connected to the toner container 230. The toner refill cartridge 9 may be mounted on the mounting portion 11. The toner inlet portion 12 is connected to the mounting portion 11 to receive toner from the toner refill cartridge 9 and transfer the toner to the toner container 230. For example, the mounting portion 11 may have a lower body 14 and an upper body 15. An accommodation portion 151 is provided in the upper body 15 to accommodate a front end of the toner refill cartridge 9. The upper body 15 is combined with the lower body 14. The lower body 14 is connected to the toner container 230. The toner inlet portion 12 is provided in the lower body 14.

The toner inlet shutter 13 may be installed on the lower body 14 to be switched between the blocking location for blocking the toner inlet portion 12 and the inlet location for opening the toner inlet portion 12. For example, the toner inlet shutter 13 may be installed on the lower body 14 to be rotated between the blocking location and the inlet location. A first cylindrical portion 142 is provided in the lower body 14 to support the toner inlet shutter 13 such that the toner inlet shutter 13 is rotated. The first cylindrical portion 142 may be implemented by a cylindrical rib protruding toward the upper body 15. The toner inlet shutter 13 is provided with a second cylindrical portion 132 which encloses the first cylindrical portion 142 and is rotatably supported by the first cylindrical portion 142. The upper body 15 is combined with the lower body 14 to cover the toner inlet shutter 13. As an example, the toner inlet shutter 13 may include an opening 131. The lower body 14 may be provided with a toner inlet 141 communicating with the toner inlet portion 12. The toner inlet shutter 13 may be rotated between the blocking location, for blocking the toner inlet 141 as the opening 131 is misaligned with the toner inlet 141, and the inlet location, for opening the toner inlet 141 as the opening 131 is aligned with the toner inlet 141.

The toner inlet shutter 13 may be rotated by the driving motor 100. In an example, the driving motor 100 is provided in the main body 1. The toner inlet shutter 13 may be provided with a gear portion 133 connected to the driving motor 100. For example, the lower body 14 may be provided with a gear 16 connected to the driving motor 100, and the gear portion 133 may engage with the gear 16. An example structure for driving the toner inlet shutter 13 by using the driving motor 100 will be described later.

The toner refilling portion 10 may be provided with a location detecting sensor 17 for detecting a location of the toner inlet shutter 13. The location detecting sensor 17 may detect the location of the toner inlet shutter 13 using various methods. As an example, the location detecting sensor 17 may include a fixed electrode 171 and a movable electrode 172. The fixed electrode 171 and the movable electrode 172 may be installed on the lower body 14. The movable electrode 172 may be elastically changed between a location where the movable electrode 172 interferes with the toner inlet shutter 13 and contacts the fixed electrode 171 and a location where the movable electrode 172 is spaced apart from the fixed electrode 171. The toner inlet shutter 13 may be provided with an interference portion 134. When the toner inlet shutter 13 is located at the inlet location, the interference portion 134 may push the movable electrode 172 so that the movable electrode 172 contacts the fixed electrode 171. For example, the toner inlet shutter 13 may be rotated 180° from the inlet location and switched to the blocking location. In this case, a formation angle of the interference portion 134 may be about 180°.

Figure 4:
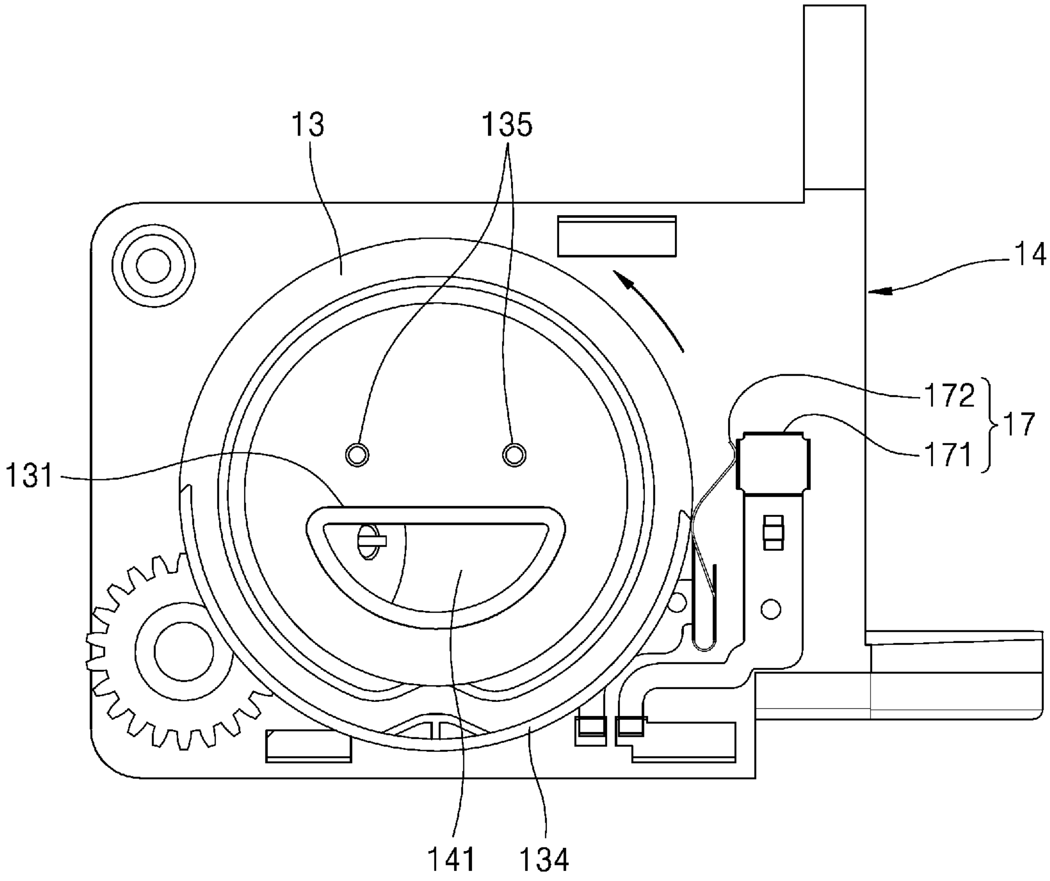
FIG. 4 is a plan view showing a state in which a toner inlet shutter is at an inlet location according to an example.
Figure 5:
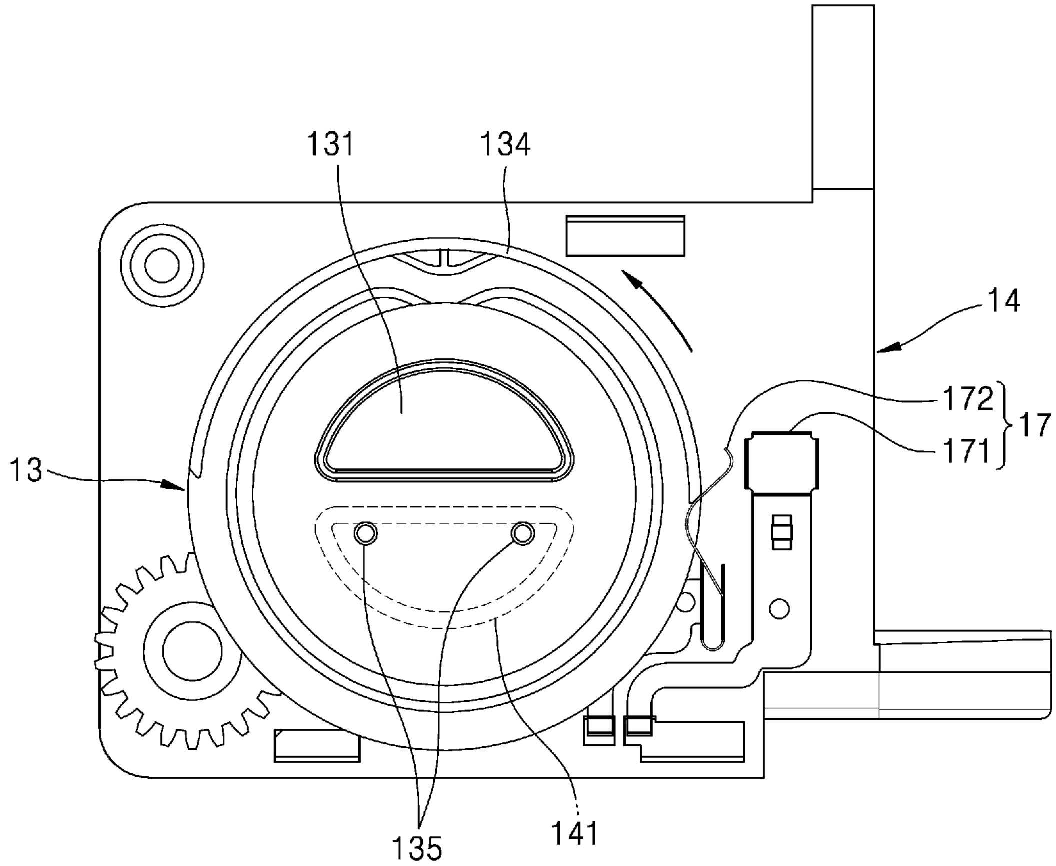
FIG. 5 is a plan view showing a state in which a toner inlet shutter is at a blocking location according to an example.

FIG. 4 is a plan view showing a state in which a toner inlet shutter is at an inlet location according to an example, and FIG. 5 is plan view showing a state in which a toner inlet shutter is at a blocking location according to an example.

Referring to FIG. 4, as the toner inlet shutter 13 is at the inlet location, the opening 131 is aligned with the toner inlet 141. Here, the movable electrode 172 interferes with the interference portion 134 and contacts the fixed electrode 171. This state is referred to as an ON state of the location detecting sensor 17. In the state shown in FIG. 4, the toner inlet shutter 13 is rotated counterclockwise. While the toner inlet shutter 13 is rotated from the inlet location to the blocking location, the movable electrode 172 continuously interferes with the interference portion 134 and remains in contact with the fixed electrode 171. Therefore, the location detecting sensor 17 remains in the ON state. When the toner inlet shutter 13 is, for example, rotated 180°, as shown in FIG. 5, the toner inlet shutter 13 reaches the blocking location, and the opening 131 is misaligned with the toner inlet 141. When the toner inlet shutter 13 reaches the blocking location, the interference between the interference portion 134 and the movable electrode 172 is ended, and the movable electrode 172 is spaced apart from the fixed electrode 171 by an elastic force as shown in FIG. 5. This state is referred to as an OFF state of the location detecting sensor 17. As described above, when the state of the location detecting sensor 17 is changed from the ON state to the OFF state, the toner inlet shutter 13 may be determined to reach the blocking location.

To switch the toner inlet shutter 13 from the blocking location to the inlet location, the toner inlet shutter 13 may be rotated counterclockwise in the state shown in FIG. 5. While the toner inlet shutter 13 is rotated from the blocking location to the inlet location, the movable electrode 172 does not interfere with the interference portion 134 and remains spaced apart from the fixed electrode 171. Therefore, the location detecting sensor 17 remains in the OFF state. When the toner inlet shutter 13 is, for example, rotated 180°, as shown in FIG. 4, the toner inlet shutter 13 reaches the inlet location, and the opening 131 and the toner inlet 141 are aligned with each other. When the toner inlet shutter 13 reaches the inlet location, the movable electrode 172 interferes with the interference portion 134, so that the movable electrode 172 contacts the fixed electrode 171, and the location detecting sensor 17 is in the ON state again. As described above, when the state of the location detecting sensor 17 is changed from the OFF state to the ON state, the toner inlet shutter 13 may be determined to reach the inlet location.

According to an example structure for rotating the toner inlet shutter 13 to the blocking location and the inlet location by using the driving motor 100, a user does not need to rotate the toner refill cartridge 9, thereby improving user convenience. Also, as the location of the toner inlet shutter 13 may be reliably detected using the location detecting sensor 17, the toner inlet shutter 13 may accurately be at the blocking location or the inlet location by controlling the driving motor 100 on the basis of a detection signal of the location detecting sensor 17. Therefore, compared to a structure in which a user opens the toner inlet shutter 13 by rotating the toner refill cartridge 9, a breakage caused by an excessive rotation of the toner inlet shutter 13 and toner leakage caused by an insufficient rotation of the toner inlet shutter 13 may be reduced or prevented.

Figure 6:
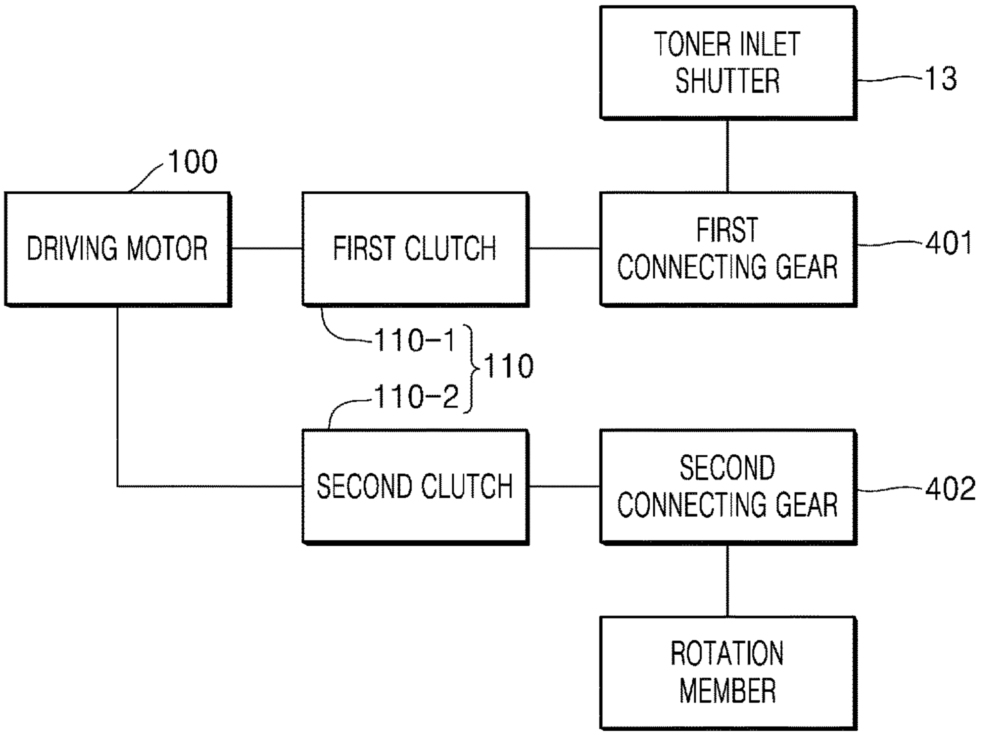
FIG. 6 is a block diagram showing a driving structure for rotating a toner inlet shutter by using a driving motor according to an example.

FIG. 6 is a block diagram showing a driving structure for rotating a toner inlet shutter by using a driving motor according to an example.

Referring to FIG. 6, the driving motor 100 and the clutch 110 may be connected to each other by one or more gears. The driving motor 100 may drive a rotation member provided in the main body 1. For example, the driving motor 100 may drive the transfer roller 5, the pickup roller 71, the fuser 6, or the discharge roller 73. The driving motor 100 may be connected to the rotation member provided in the main body 1 by a gear train (not shown). The driving motor 100 may drive a rotation member of the developing cartridge 2. For example, the driving motor 100 may drive the photosensitive drum 21, the developing roller 22, the charging roller 23, the supply roller 24, the conveying member 211, the waste toner transporting members 221, 222, and 223, or the toner supply members 232, 232, and 233. The driving motor 100 may be connected to a rotation member of the developing cartridge 2 by a gear train (not shown). A rotation shaft of a rotation member may protrude to the outside by passing through one side portion of the developing cartridge 2, and a protruding end of the rotation shaft may be combined, for example, with a gear connected to the gear train. In an example, a driving force of the driving motor 100 may be selectively transmitted to the toner inlet shutter 13 by using the clutch 110. The clutch 110 may selectively transmit the driving force of the driving motor 100 to the toner inlet shutter 13 and a rotation member. For example, the clutch 110 may selectively transmit the driving force to the toner inlet shutter 13 and a rotation member according to a rotation direction of the driving motor 100.

The clutch 110 may include a first clutch 110-1 for selectively transmitting the driving force of the driving motor 110 to the toner inlet shutter 13. For example, the first clutch 110-1 may be between a first connecting gear 401 and the driving motor 100. The first connecting gear 401 may be connected to the gear 16 engaging with the gear portion 133 of the toner inlet shutter 13. The clutch 110 may include a second clutch 110-2 for selectively transmitting the driving force of the driving motor 100 to a rotation member, for example, to a rotation member of the developing cartridge 2. For example, the second clutch 110-2 may be between a second connecting gear 402 and the driving motor 100. The second connecting gear 402 may be connected to a rotation member of the developing cartridge 2.

The first clutch 110-1 and the second clutch 110-2 may each have various structures. For example, the first clutch 110-1 and the second clutch 110-2 may each include a one-way clutch for selectively transmitting the driving force of the driving motor 100 to the toner inlet shutter 13 and a rotation member of the developing cartridge 2 according to a rotation direction of the driving motor 100. The first clutch 110-1 may transmit the driving force to the toner inlet shutter 13 when the driving motor 100 is rotated in a first direction, and the second clutch 110-2 may transmit the driving force to a rotation member when the driving motor 100 is rotated in a second direction, which is an opposite direction of the first direction.

Figure 7:
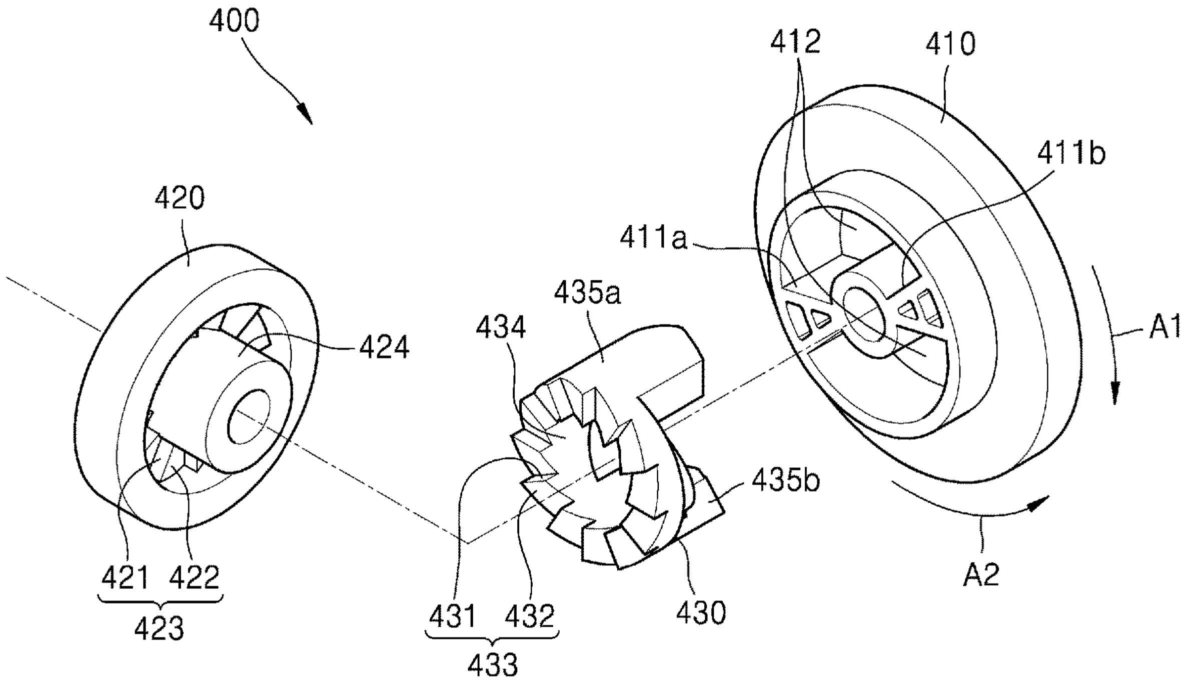
FIG. 7 is an exploded perspective view of a one-way clutch according to an example.
Figure 8:
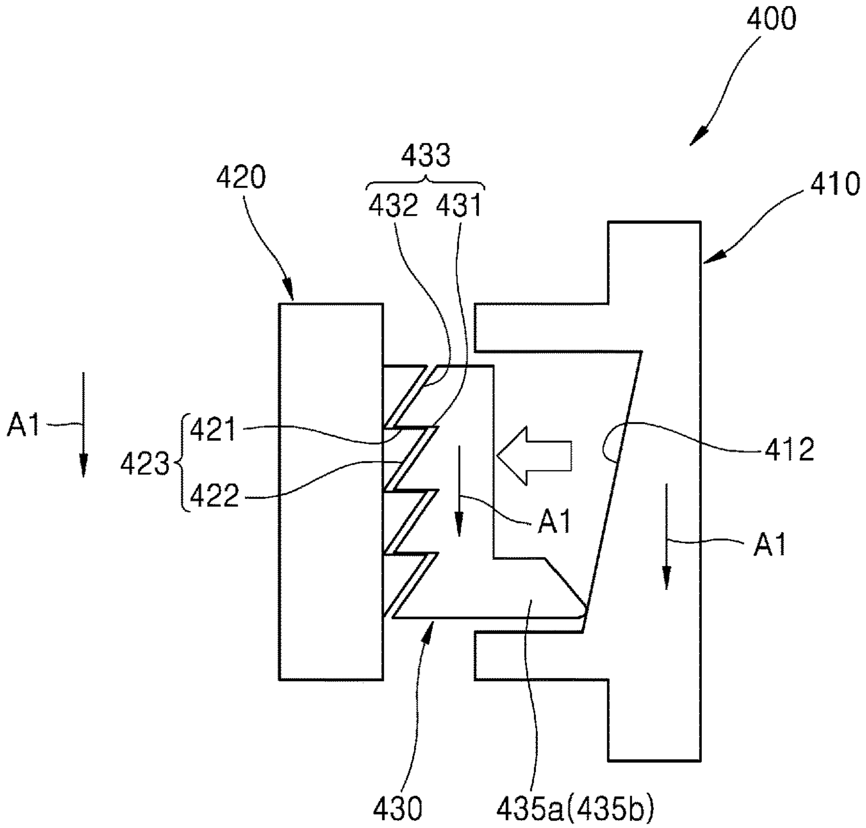
FIGS. 8 and 9 are schematic views showing an operation of the one-way clutch shown in FIG. 7 according to various examples.
Figure 9:
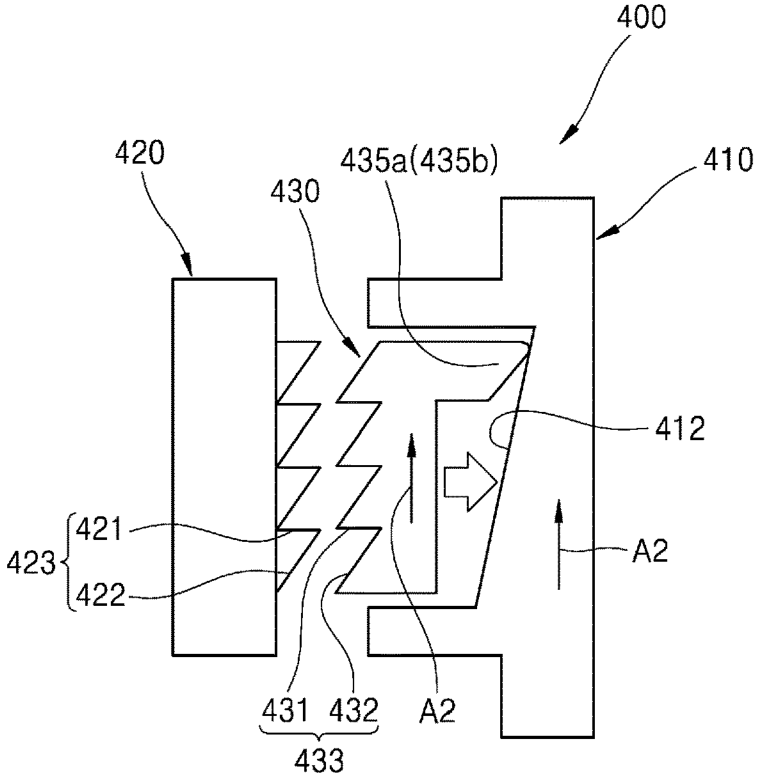

FIG. 7 is an exploded perspective view of a one-way clutch according to an example. FIGS. 8 and 9 are schematic views showing an operation of the one-way clutch shown in FIG. 7 according to various examples.

Referring to FIGS. 7 through 9, a one-way clutch 400 may include an input member 410, an output member 420, and a clutch bush 430 between the input member 410 and the output member 420. In an example, the one-way clutch 400 has a structure in which, when the input member 410 is rotated in a direction A1, the output member 420 is rotated in the direction A1, and, when the input member 410 is rotated in a direction A2, the output member 420 is not rotated.

The clutch bush 430 is supported on the output member 420 to be axially moved. For example, the output member 420 may be provided with a boss 424 extending axially, and the clutch bush 430 may be provided with a penetration portion 434 into which the boss 424 may be inserted. The input member 410 may be connected to the driving motor 100. The input member 410 is to rotate the clutch bush 430. For example, the input member 410 may be provided with driving ribs **411*a* and 411*b* extending radially. The clutch bush 430 may be provided with driven ribs 435*a* and 435*b*** facing the driving ribs 411*a* and 411*b* in a rotation direction. Therefore, when the input member 410 is rotated, the driving ribs 411*a* and 411*b* push the driven ribs 435*a* and 435*b*, and the clutch bush 430 is rotated in the same direction as the input member 410. A first clutch portion 433 may be provided on the opposite side of the driven ribs 435*a* and 435*b* of the clutch bush 430. The output member 420 may be provided with a second clutch portion 423 to engage with the first clutch portion 433. The first clutch portion 433 may have a shape in which a first locking portion 431 and a first inclined portion 432 are repeatedly arranged in a circumferential direction, and the second clutch portion 423 may have a shape in which a second locking portion 421 and a second inclined portion 422 respectively facing the first locking portion 431 and the first inclined portion 432 are repeatedly arranged in the circumferential direction. A facing surface 412 of the input member 410 axially facing the driven ribs 435*a* and 435*b* is an axially inclined surface. The facing surface 412 may have a structure in which the clutch bush 430 is pushed toward the output member 420 when the input member 410 is rotated in the direction A1. For example, the facing surface 412 between the driving ribs 411*a* and 411*b* may be an inclined surface protruding toward the output member 420 when being rotated in the direction A1. FIGS. 8 and 9 conceptually illustrate that the facing surface 412 has an inclined shape.

As shown in FIG. 8 when the input member 410 is rotated in the direction A1, the facing surface 412 contacts the driven ribs 435*a* and 435*b* of the clutch bush 430 and pushes the driven ribs 435*a* and 435*b* toward the output member 420. When the driving ribs 411*a* and 411*b* contact the driven ribs 435*a* and 435*b*, the clutch bush 430 is rotated in the direction A1. The first locking portion 431 and the second locking portion 421 face each other, and the first locking portion 431 pushes the second locking portion 421 in the direction A1. Therefore, the output member 420 is rotated in the direction A1.

As shown in FIG. 9, when the input member 410 is rotated in the direction A2, the driving ribs 411*a* and 411*b* are spaced apart from the driven ribs 435*a* and 435*b*, and the clutch bush 430 is not rotated. The facing surface 412 is axially spaced apart from the driven ribs 435*a* and 435*b*. When the driving ribs 411*a* and 411*b* respectively contact the driven ribs 435*a* and 435*b*, the clutch bush 430 is rotated in the direction A2. The first locking portion 431 is spaced apart from the second locking portion 421 in the direction A2, and the first inclined portion 422 and the second inclined portion 432 contact each other. The clutch bush 430 is pushed toward the input member 410 by the first inclined portion 422 and the second inclined portion 432, and the first clutch portion 433 is spaced apart from the second clutch portion 423. Therefore, the output member 420 is not rotated.

The one-way clutch 400 shown in FIGS. 7 through 9 may be applied as the first clutch 110-1. In this case, the input member 410 may be connected to the driving motor 100, and the output member 420 may be connected to the toner inlet shutter 13 through the first connecting gear 401. For example, when the driving motor 100 is rotated in a first direction, the input member 410 and the output member 420 are rotated together in the direction A1 to rotate the toner inlet shutter 13 between a blocking location and an inlet location. When the driving motor 100 is rotated in a second direction, the input member 410 is rotated in the direction A2 but the output member 420 is not rotated, and thus, a driving force of the driving motor 100 is not transmitted to the toner inlet shutter 13. Although not shown in the drawings, an electronic clutch may be applied as the first clutch 110-1 to selectively transmit the driving force of the driving motor 100 to the toner inlet shutter 13 by an electrical signal.

Figure 10:
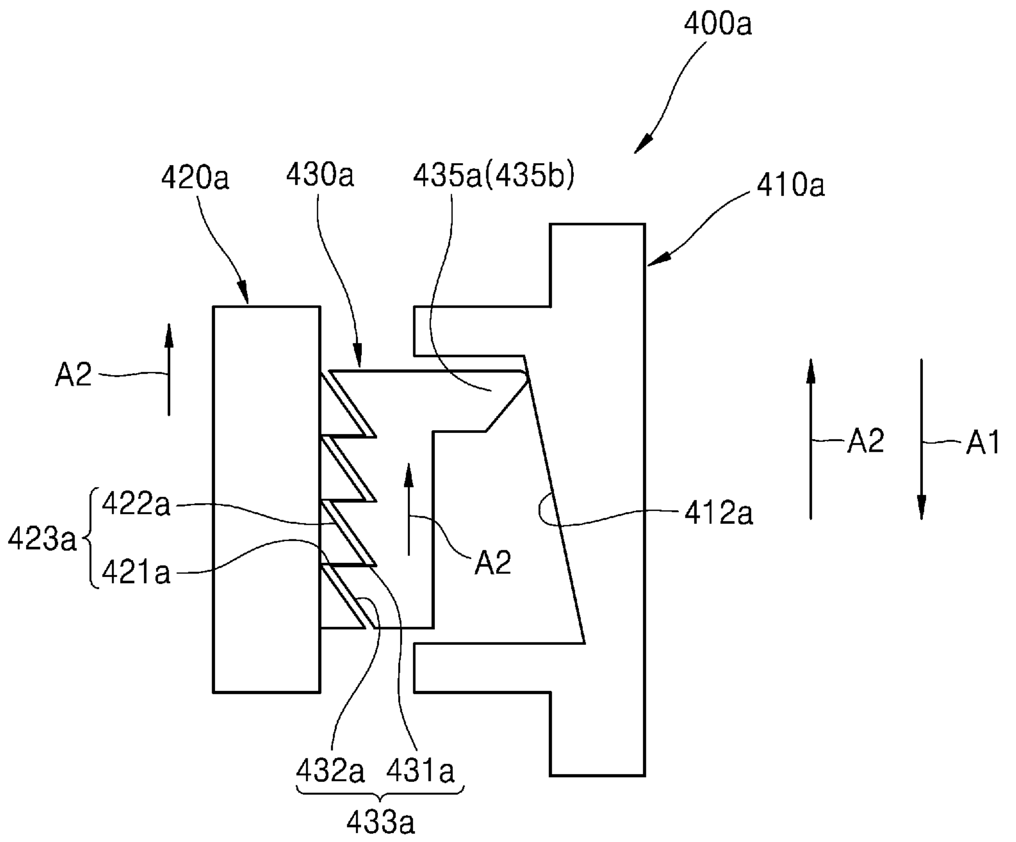
FIG. 10 is a schematic configuration diagram of a one-way clutch according to an example.

FIG. 10 is a schematic configuration diagram of a one-way clutch according to an example. An example one-way clutch 400*a* differs from the one-way clutch 400 shown in FIGS. 7 through 9 in having a structure in which, when an input member 410*a* is rotated in a direction A2, an output member 420*a* is rotated in the direction A2, and, when the input member 410*a* is rotated in a direction A1, the output member 420*a* is not rotated. Hereinafter, differences therebetween will be mainly described.

Referring to FIG. 10, a clutch bush 430*a* is supported by the output member 420*a* to be axially moved. The input member 410*a* may be connected to the driving motor 100. The input member 410*a* is to rotate the clutch bush 430*a*. The clutch bush 430*a* may be provided with a first clutch portion 433*a*, and the output member 420*a* may be provided with a second clutch portion 423*a* to engage with the first clutch portion 433*a*. The first clutch portion 433*a* may have a shape in which a first locking portion 431*a* and an inclined portion 432*a* are repeatedly arranged in a circumferential direction, and the second clutch portion 423*a* may have a shape in which a second locking portion 421*a* and a second inclined portion 422*a* respectively facing the first locking portion 431*a* and the first inclined portion 432*a* are repeatedly arranged in the circumferential direction. A facing surface 412*a* of the input member 410*a* may have an inclined surface protruding toward the output member 420*a* when being rotated in the direction A2 to push the clutch bush 430*a* toward the output member 420*a* when the input member 410*a* is rotated in the direction A2. In other words, the first clutch portion 433*a*, the second clutch portion 423*a*, and the facing surface 412*a* are respectively symmetrical to the first clutch portion 433, the second clutch portion 423, and the facing surface 412*a* shown in FIGS. 7 through 9. Therefore, when the input member 410*a* is rotated in the direction A1, the output member 420*a* may not be rotated. When the input member 410*a* is rotated in the direction A2, the output member 420*a* may also be rotated in the direction A2.

The one-way clutch 400*a* shown in FIG. 10 may be applied as the second clutch 110-2. In this case, the input member 410*a* may be connected to the driving motor 100, and the output member 420*a* may be connected to a rotation member of the developing cartridge 2 through the second connecting gear 402. For example, when the driving motor 100 is rotated in a first direction, the input member 410*a* is rotated in the direction A1 but the output member 420*a* is not rotated so that a driving force of the driving motor 100 is not transmitted to the rotation member of the developing cartridge 2. When the driving motor 100 is rotated in a second direction, the input member 410*a* and the output member 420*a* may be rotated together in the direction A2 so that the driving force of the driving motor 100 may be transmitted to a rotation member of the developing cartridge 2. Although not shown in the drawings, an electronic clutch may be applied as the second clutch 110-2 to selectively transmit the driving force of the driving motor 100 to the rotation member of the developing cartridge 2 by an electrical signal.

According to an example structure for selectively transmitting the driving force of the driving motor 100 to the toner inlet shutter 13 by using the clutch 110, the toner inlet shutter 13 may be driven by using the driving motor 100 for driving a rotation member of the developing cartridge 2. Therefore, an additional driving motor for driving the toner inlet shutter 13 does not need to be applied, and thus, manufacturing cost of an image forming apparatus may be reduced.

As described above, when toner contained in the toner container 230 is consumed, the toner container 230 may be provided with new toner by using the toner refill cartridge 9. An example electrophotographic image forming apparatus has a structure in which the toner refill cartridge 9 is inserted from the outside of the main body 1 into the main body 1 to be mounted on the toner refilling portion 10 and separated from the main body 1 after the toner container 230 is provided with toner. For this, referring to FIG. 1, the main body 1 is provided with a communicating portion 8 for allowing the toner refill cartridge 9 to access the toner refilling portion 10 from the outside of the main body 1. The toner refill cartridge 9 is removed from the communicating portion 8 after toner is provided. According to an example structure described above, the toner container 230 may be provided with toner through the toner refiling portion 10. Therefore, a replacement time of the developing cartridge 2 may be extended until the lifespan of the photosensitive drum 21 is terminated, thereby reducing printing cost per sheet. Because toner may be provided while the developing cartridge 2 is mounted in the main body 1, user convenience may be improved.

Figure 11:
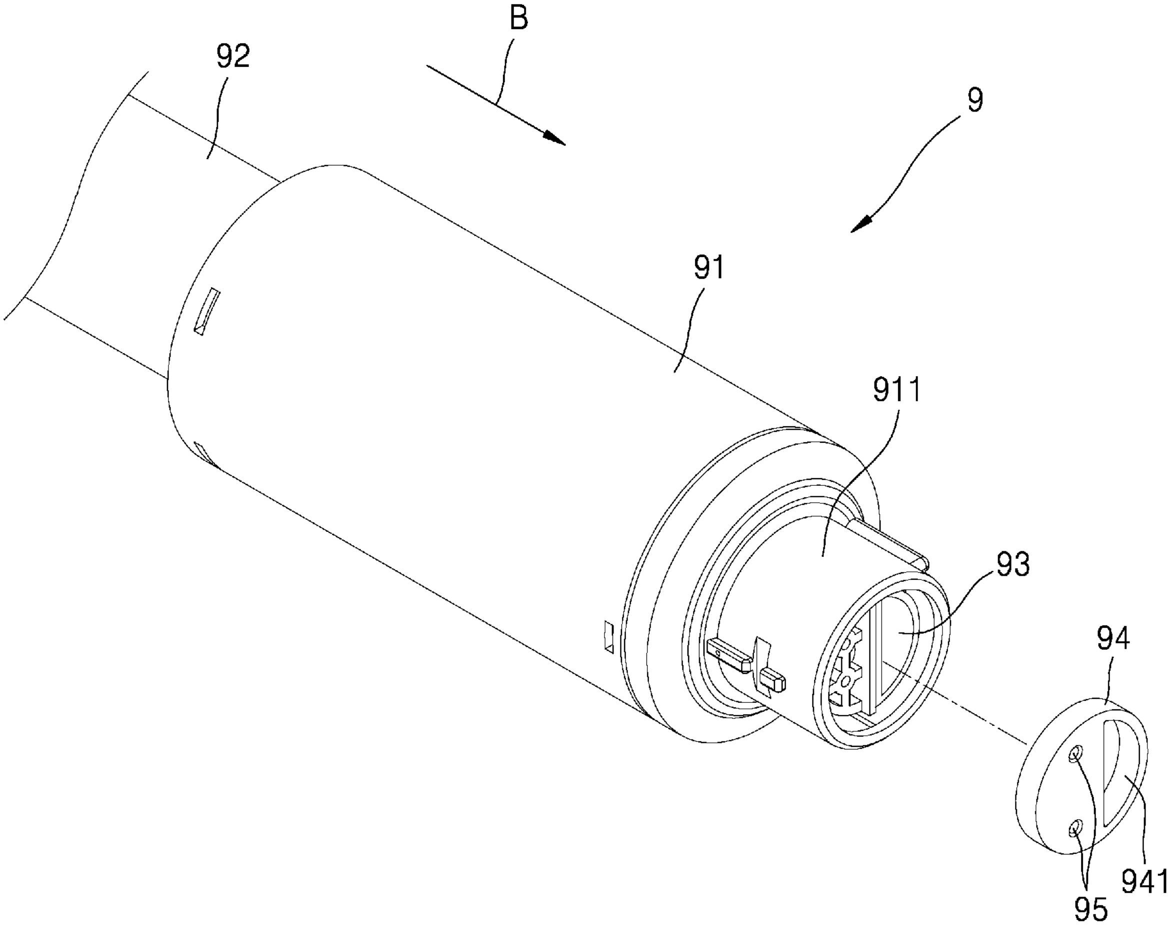
FIG. 11 is a schematic partial exploded perspective view of a toner refill cartridge according to an example.

FIG. 11 is a schematic partial exploded perspective view of a toner refill cartridge according to an example.

Referring to FIGS. 1 and 11, the toner refill cartridge 9 may be a syringe-shaped toner refill cartridge having a body 91 in which toner is contained and a plunger 92, which is moveably combined with the body 91 in a longitudinal direction B to push toner to the outside of the body 91. A front end 911 of the body 91 is provided with a toner outlet 93 through which toner may be discharged from the body 91. When the plunger 92 is pressed in the longitudinal direction B while the toner refill cartridge 9 is mounted on the toner refilling portion 10, toner contained in the body 91 may be supplied to the toner container 230 of the developing cartridge 2 through the toner refilling portion 10.

A toner outlet shutter 94 is installed at the front end 911 of the body 91 to be switched between an outlet location for opening the toner outlet 93 and a closing location for closing the toner outlet 93. For example, the toner outlet shutter 94 may be rotated between the outlet location and the closing location. An opening 941 is provided in the toner outlet shutter 94. The toner outlet 93 and the opening 941 are aligned with each other at the outlet location, and the toner outlet 93 and the opening 941 are misaligned with each other at the closing location.

The toner outlet shutter 94 may be connected to the toner inlet shutter 13 to be rotated. The toner inlet shutter 13 may be connected to the toner outlet shutter 94 to be rotated between a blocking location for blocking the toner outlet 93 and the toner inlet portion 12 and an inlet location for opening the toner outlet 93 and the toner inlet portion 12. In other words, the toner outlet shutter 94 may be rotated together with the toner inlet shutter 13 between the outlet location and the closing location.

When the toner refill cartridge 9 is mounted on the toner refilling portion 10 through the communicating portion 8 of the main body 1, the front end 911 of the body 91 may be inserted into the accommodation portion 151 provided in the toner refilling portion 10, and the toner outlet shutter 94 may be connected to the toner inlet shutter 13. For example, referring to FIGS. 4 and 11, a first connecting portion 135 and a second connecting portion 95 are respectively provided in the toner inlet shutter 13 and the toner outlet shutter 94. When the toner refill cartridge 9 is mounted on the toner refilling portion 10, the first connecting portion 135 and the second connecting portion 95 are connected to each other. The first connecting portion 135 and the second connecting portion 95 are connected to each other so that the toner outlet shutter 94 and the toner inlet shutter 13 are rotated together. For example, the first connecting portion 135 may include a pair of protrusions, and the second connecting portion 95 may include a pair of holes into which the pair of protrusions are inserted.

The toner refill cartridge 9 may be inserted into the main body 1 through the communicating portion 8 and mounted on the toner refilling portion 10 while the toner outlet shutter 94 is located at the closing location. The toner inlet shutter 13 is at the blocking location. The toner outlet 93 is aligned with the toner inlet 141. The first connecting portion 135 and the second connecting portion 95 are connected to each other. The toner outlet shutter 94 is at the closing location, and the toner inlet shutter 13 is at the blocking location. Therefore, toner of the toner refill cartridge 9 may not be discharged to the toner refilling portion 10. The driving motor 100 is rotated in a first direction to open the toner outlet 93 and the toner inlet 141. A driving force of the driving motor 100 is transmitted to the toner inlet shutter 13 by the first clutch 110-1, and the toner inlet shutter 13 is rotated from the blocking location to the inlet location. The second clutch 110-2 blocks the driving force of the driving motor 100. Therefore, the driving force of the driving motor 100 is not transmitted to a rotation member of the developing cartridge 2. The toner outlet shutter 94 is rotated together with the toner inlet shutter 13 from the closing location to the outlet location. When the toner inlet shutter 13 reaches the inlet location, the toner outlet shutter 94 reaches the outlet location. The movable electrode 172 is pushed by the interference portion 134 provided in the toner inlet shutter 13 and contacts the fixed electrode 171, and a state of the location detecting sensor 17 is changed from an OFF state to an ON state. Driving of the driving motor 100 is stopped. The toner outlet 93, the opening 941 of the toner outlet shutter 94, the opening 131 of the toner inlet shutter 13, and the toner inlet 141 are sequentially aligned. Toner inside the body 91 may be discharged to the toner refilling portion 10 through the toner outlet 93 and the opening 941 by pressing the plunger 92 in the longitudinal direction B. Toner passes the toner inlet portion 12 through the opening 131 of the toner inlet shutter 13 and the toner inlet 141 and is provided to the toner container 230 of the developing cartridge 2. When the plunger 92 reaches a lower location, toner refilling is completed.

Before the toner refill cartridge 9 is separated from the toner refilling portion 10, the driving motor 100 is rotated in the first direction. The driving force of the driving motor 100 is transmitted to the toner inlet shutter 13 by the first clutch 110-1, and the toner inlet shutter 13 is rotated from an opening location to the blocking location. The toner outlet shutter 94 is rotated together with the toner inlet shutter 13 from the outlet location to the closing location. When the toner inlet shutter 13 reaches the blocking location, the outlet shutter 94 reaches the closing location. The interference between the interference portion 134 and the movable electrode 172 is ended, and the movable electrode 172 is spaced apart from the fixed electrode 171. The state of the location detecting sensor 17 is changed from the ON state to the OFF state. Driving of the driving motor 100 is stopped. The toner refill cartridge 9 may be separated from the toner refilling portion 10.

The driving motor 100 may be rotated in the second direction to perform a print job. The driving force of the driving motor 100 may be transmitted to a rotation member of the developing cartridge 2 by the second clutch 110-2. Because the driving force of the driving motor 100 is not transmitted by the first clutch 110-1, the toner inlet shutter 13 is not rotated and remains at the blocking location.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. An image forming apparatus comprising:
a main body;
a driving motor;
a developing cartridge including:
a toner container to contain toner,
a mounting portion to receive a toner refill cartridge,
a toner inlet portion to connect the mounting portion to the toner container, and
a toner inlet shutter to be switched between a blocking location for blocking the toner inlet portion and an inlet location for opening the toner inlet portion; and
a clutch to selectively transmit a driving force of the driving motor to the toner inlet shutter.

2. The image forming apparatus of claim 1, wherein the toner inlet shutter is rotatable between the blocking location and the inlet location.

3. The image forming apparatus of claim 1, further comprising a location detecting sensor to detect a location of the toner inlet shutter.

4. The image forming apparatus of claim 1, wherein the clutch includes a one-way clutch to selectively transmit the driving force to the toner inlet shutter according to a rotation direction of the driving motor.

5. The image forming apparatus of claim 1,
wherein the developing cartridge includes a rotation member, and
wherein the clutch includes a first clutch to selectively transmit a driving force of the driving motor to the toner inlet shutter and a second clutch to selectively transmit a driving force of the driving motor to the rotation member.

6. The image forming apparatus of claim 5, wherein the first clutch and the second clutch are to selectively transmit a driving force to the toner inlet shutter and the rotation member, respectively, according to a rotation direction of the driving motor.

7. The image forming apparatus of claim 6,
wherein the first clutch is to transmit the driving force to the toner inlet shutter in response to a rotation of the driving motor in a first direction, and
wherein the second clutch is to transmit the driving force to the rotation member in response to a rotation of the driving motor in a second direction, which is an opposite direction of the first direction.

8. The image forming apparatus of claim 1,
wherein the toner refill cartridge includes a body, an outlet through which toner is to be discharged from the body, and a toner outlet shutter switchable between an outlet location and a closing location for opening and closing the outlet, and
wherein the toner outlet shutter is to connect to the toner inlet shutter.

9. The image forming apparatus of claim 8, wherein the toner outlet shutter is to be switched together with the toner inlet shutter between the closing location and the outlet location as the toner inlet shutter is switched between the blocking location and the inlet location.

10. The image forming apparatus of claim 1, wherein the main body is provided with a communicating portion to allow the toner refill cartridge to be mounted from the outside into the mounting portion.

11. An image forming apparatus comprising:
a main body;
a driving motor;
a developing cartridge including:
a toner container,
a rotation member,
a mounting portion to receive a toner refill cartridge, the toner refill cartridge being provided with a toner outlet and a toner outlet shutter to selectively open and close the toner outlet,
a toner inlet portion to connect the mounting portion to the toner container, and
a toner inlet shutter to connect to the toner outlet shutter to be switched between a blocking location for blocking the toner outlet and the toner inlet portion and an inlet location for opening the toner outlet and the toner inlet portion; and
a clutch to selectively transmit a driving force of the driving motor to the toner inlet shutter and the rotation member.

12. The image forming apparatus of claim 11, further comprising a location detecting sensor to detect a location of the toner inlet shutter.

13. The image forming apparatus of claim 11, wherein the clutch includes a first clutch to transmit the driving force to the toner inlet shutter in response to a rotation of the driving motor in a first direction.

14. The image forming apparatus of claim 13, wherein the clutch includes a second clutch to transmit the driving force to the rotation member in response to a rotation of the driving motor in a second direction, which is an opposite direction of the first direction.

15. The image forming apparatus of claim 11, wherein the main body is provided with a communicating portion to allow the toner refill cartridge to be mounted from the outside into the mounting portion.

* * * * *